United States Patent [19]

Rohrer et al.

[11] Patent Number: 4,969,754
[45] Date of Patent: Nov. 13, 1990

[54] ROTATIONAL BEARING ARRANGEMENT FOR HIGH SPEEDS OF ROTATION

[75] Inventors: Reinhard Rohrer; Henri Bürki, both of Biel; Jürg Bischofberger, Elsau; Raymond Frey, Zürich, all of Switzerland

[73] Assignee: Rieter Machine Works Limited, Winterthur, Switzerland

[21] Appl. No.: 438,058

[22] Filed: Nov. 20, 1989

Related U.S. Application Data

[63] Continuation of Ser. No. 192,040, May 9, 1988, abandoned.

[30] Foreign Application Priority Data

May 8, 1987 [CH] Switzerland ............... 01766/87

[51] Int. Cl.$^5$ ............................................. F16C 33/58
[52] U.S. Cl. ................................. 384/512; 384/513; 384/537
[58] Field of Search .............. 384/512, 515, 513, 517, 384/518, 493, 537

[56] References Cited

U.S. PATENT DOCUMENTS

| | | | |
|---|---|---|---|
| 3,056,636 | 10/1962 | Mims | 384/517 |
| 3,454,313 | 7/1969 | Lohneis | 384/493 |
| 4,603,983 | 8/1986 | Hofmann et al. | 384/512 |

FOREIGN PATENT DOCUMENTS 2113905 10/1971 Fed. Rep. of Germany.
3148191 6/1983 Fed. Rep. of Germany.

Primary Examiner—Lenard A. Footland
Attorney, Agent, or Firm—Werner W. Kleeman

[57] ABSTRACT

A rotational bearing arrangement for high speeds of rotation comprises a casing and a shaft mounted therein at a first ball bearing and a second ball bearing. At least the first ball bearing is a radial shoulder ball bearing. The first ball bearing has a first track formed on the shaft and a first outer race and the second ball bearing has a second track formed on the shaft and a second outer race. One coacting track and one outer race in combination form the ways for the balls of each associated ball bearing. The outer races are disposed in hollow substantially cylindrical seats formed by the casing. The first outer race when secured in its assembled state is disposed in a seat which constitutes a sliding seat, the seat dimensions being such that the outer race when introduced into but not secured in the seat can be reciprocated substantially effortlessly in axial direction. Certain advantages of such rotational bearing arrangement are that even at very high rotational speeds vibrations and excessive wear are obviated and the rotational bearing arrangement has a long service life. Difficulties because of balancing problems and the stability of shaft shape are obviated.

8 Claims, 2 Drawing Sheets

ROTATIONAL BEARING ARRANGEMENT FOR HIGH SPEEDS OF ROTATION

CROSS-REFERENCE TO RELATED APPLICATIONS

This application is a continuation of the commonly assigned, copending U.S. patent application Ser. No. 07/192,040, filed May 9, 1988, entitled: "ROTATIONAL BEARING ARRANGEMENT FOR HIGH SPEEDS OF ROTATION AND METHOD OF FABRICATION THEREOF", now abandoned which, in turn, is related to the commonly assigned, copending U.S. application Ser. No. 07/192,073, filed May 9, 1988, entitled "ROTATIONAL BEARING ARRANGEMENT FOR HIGH ROTATIONAL SPEEDS". This application is also related to the divisional application Ser. No. 07/369,942, filed June 22, 1989 and entitled: "METHOD OF PRODUCING A ROTATIONAL BEARING ARRANGEMENT FOR HIGH SPEEDS OF ROTATION".

BACKGROUND OF THE INVENTION

The present invention relates to a new and improved construction of a rotational or rotary bearing arrangement for high speeds of rotation and to a method of fabrication of such rotational or rotary bearing arrangement.

Generally speaking, the rotational or rotary bearing arrangement for high speeds of rotation comprises a casing or housing and a shaft which is rotatably mounted therein. The shaft has a first track and a second track for receiving the respective balls of a first ball bearing and a second ball bearing. A closed first ball cage is associated with the first ball bearing and a closed second ball cage is associated with the second ball bearing. A first outer race is associated with the first ball bearing and a second outer race is associated with the second ball bearing. The outer races are disposed in a respective first hollow substantially cylindrical seat and a second hollow cylindrical seat, which seats are coaxially arranged with respect to the rotational axis of the rotational bearing arrangement and are formed by the casing or housing.

Rotational bearing arrangements of this type are known, for example, from German Pat. No. 2,113,905, published Oct. 14, 1971 and from Swiss Pat. No. 514,796, granted Oct. 31, 1971. They are widely used to drive spinning centrifuges of open-end spinning machines where there occur speeds of up to 100,000 revolutions per minute.

It is therefore desirable for the peripheral or circumferential speed of the balls of the ball bearings to be as small as possible. Hence, the shaft itself is formed with tracks operative or effective as ball bearing inner races, the balls running in such tracks. This greatly reduces the distance which the balls have to travel per revolution.

It has been found that these known arrangements or systems may be subject to vibrations and excessive wear which reduce their service or working life in an unsatisfactory manner. These disadvantages occur when the required high precision of the components is unsatisfactory. More particularly, the distance between the ball tracks on the shaft and the distance between the bearing outer races must be adapted to one another very accurately. The length of the spacer sleeves or bushings which are used in these known arrangements or systems and with which the outer races are in engagement must therefore be very accurate, but it is difficult in practice to achieve the required accuracy.

According to German Published Patent Application No. 3,605,274 A1, published Sept. 11, 1987, to enable the rotational bearing arrangement to run at very high speeds, the shaft is constructed in two parts which are introduced into a bushing or sleeve and thus held together. The required between-tracks spacing can be adjusted by varying the axial distance between the two parts of the shaft. However, in this construction the fact that the two relatively heavy shaft parts are clamped in the bushing impairs the linearity or straightness of the shaft, leading to difficulties at the very high speeds of rotation which occur. The necessary accurate adjustability cannot be provided and difficulties occur because of balancing problems.

SUMMARY OF THE INVENTION

Therefore with the foregoing in mind it is a primary object of the present invention to provide a new and improved construction of a rotational bearing arrangement for high speeds of rotation which is not afflicted with the aforementioned drawbacks and shortcomings of the prior art constructions.

It is another important object of the present invention to obviate the disadvantages hereinbefore noted and to provide a rotational bearing arrangement for high speeds of rotation, so as to realize a construction of rotational bearing arrangement which not only is relatively economical to fabricate and relatively easy to assemble, but affords enhanced service life and operational reliability.

Another noteworthy object of the present invention relates to an improved rotational bearing arrangement exceedingly useful for supporting a rotatable member at high speeds of rotation.

Yet a further significant object of the present invention aims at providing a new and improved construction of a rotational bearing arrangement for high speeds of rotation which is relatively simple in construction and design, relatively economical to manufacture, highly reliable in operation, not readily subject to breakdown or malfunction and requires a minimum of maintenance and servicing.

Now in order to implement these and still further objects of the invention, which will become more readily apparent as the description proceeds, the rotational bearing arrangement for high speeds of rotation is manifested by the features that at least the first ball bearing is a radial shoulder ball bearing and the first outer race when secured in its assembled state is introduced into the first seat. This first seat is in the form of a sliding seat, and the seat dimensions are such that the first outer race when introduced into but not yet secured or fixed in the seat can be reciprocated or displaced substantially effortlessly, in other words, practically without the application of any force in the axial direction beyond the position or place taken up or occupied by the outer race in its secured operative position.

As stated heretofore, the present invention is not only concerned with improved constructions of such rotational bearing arrangements, but also is directed to an improved method of fabricating these rotational bearing arrangements. According to method aspects of the present invention for the fabrication or production of such rotational or rotary bearing arrangements the second outer race is secured to the casing. Then either the first cage with its associated balls is placed on the first track and the first outer race is pushed over the shaft and such first outer race is introduced into the first seat, or else the first outer race is pushed over the shaft and such first outer race is introduced into the first seat and the first cage with its associated balls is placed on the first track. The first outer race is then moved substantially effortlessly until it engages the balls on the first track at a predetermined bearing pressure, and the first outer race is then secured or fixed to the casing.

With the rotational bearing arrangement of the present development, the first outer race, before being secured or fixed to the casing of the first rotational bearing, is mounted so as to be readily slidable axially so that it can be adjusted in a sliding seat. The first outer race therefore can be engaged with the balls of the first track substantially effortlessly or practically without the exertion of any force. Hence, the ball-engaging position of the first outer race can be determined very accurately, and only a predeterminate and substantially imperceptible bearing pressure has to be exerted on the balls. Consequently, after the second outer race has been secured the adjustment of the two ball bearings is very accurate.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
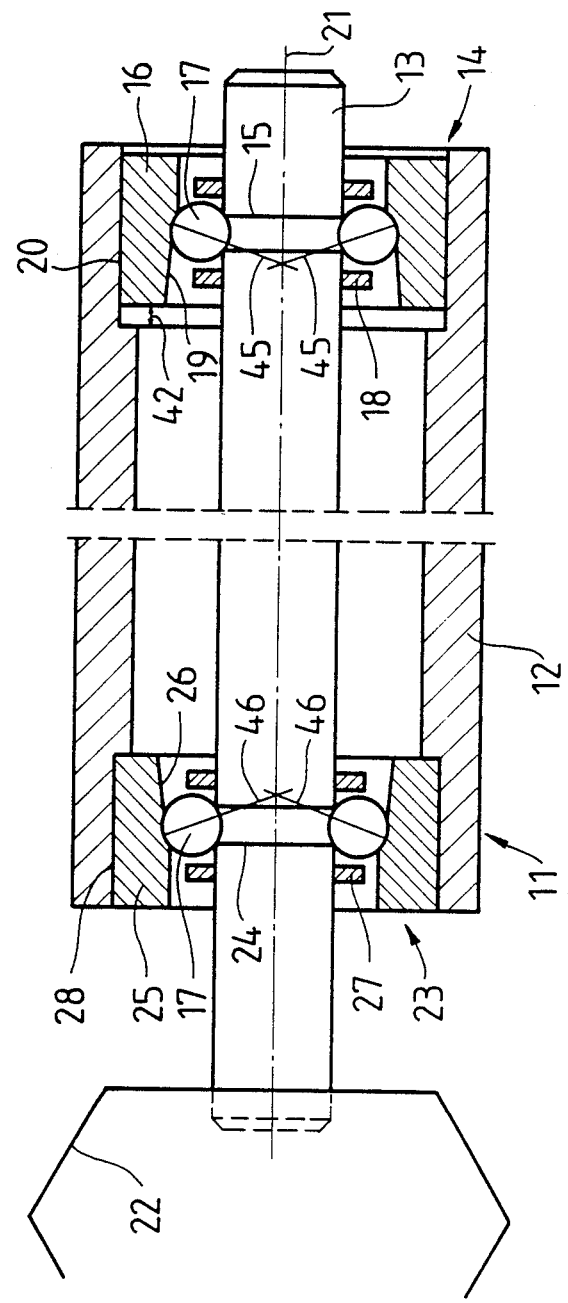
FIG. 1 is a longitudinal sectional view through a first exemplary embodiment of rotational or rotary bearing arrangement constructed according to the present invention.

Describing now the drawings, it is to be understood that only enough of the construction and details of the exemplary embodiments of rotational or rotary bearing arrangements of the present development have been depicted in the drawings as needed for those skilled in the art to readily understand the underlying principles and concepts of the present invention. Turning now specifically to FIG. 1 of the drawings, a rotational bearing arrangement 11 has a casing or housing 12 and a shaft or shaft member 13. This shaft or shaft member 13 is rotatably mounted in a first ball bearing which constitutes or defines a radial shoulder ball bearing 14. This radial shoulder ball bearing 14 has a first track or groove 15 formed on the shaft 13. The radial shoulder ball bearing 14 also comprises a first outer race 16 which is placed or mounted on balls or ball members 17. These balls or ball members 17 are guided in a first closed cage or cage member 18. The first outer race 16 is disposed in a, for instance, hollow substantially cylindrical seat or seat portion 20 formed by the casing 12. Axis 21 of the rotational bearing arrangement 11 is identical with the lengthwise or longitudinal axis of the casing 12 and the rotational axis of the shaft 13. The inside or inner surface 19 of the first outer race 16 has a shape which tapers or widens conically and axially towards the center or central region of the rotational bearing arrangement 11. When the rotational bearing arrangement 11 is used for open-end spinning, a spinning rotor 22 is provided at one end 13a of the shaft 13. The shaft 13 is also mounted in a second ball bearing 23 which can also be, but need not be, a radial shoulder ball bearing. In the embodiment under discussion, the second ball bearing 23 is of substantially the same construction as the first ball bearing, namely the radial shoulder ball bearing 14. The second ball bearing 23 has a second track or groove 24 formed on the shaft 13, a second outer race 25 having an inside or inner surface 26 and a second closed cage or cage member 27 having balls or ball members 17. The second outer race 25 is disposed in a, for instance, hollow substantially cylindrical seat or seat portion 28 formed by the casing or housing 12.

Figure 2:
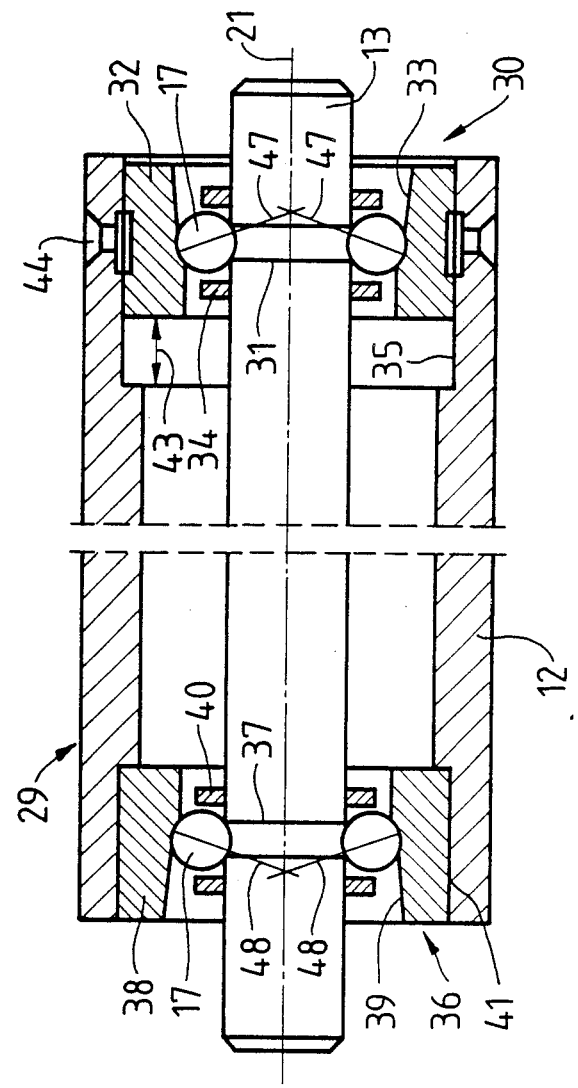
FIG. 2 is a longitudinal sectional view through a second exemplary embodiment of rotational or rotary bearing arrangement constructed according to the present invention.

FIG. 2 shows another embodiment of rotational bearing arrangement 29 comprising a casing or housing 12 and a shaft or shaft member 13. The rotational bearing arrangement 29 also has a first ball bearing 30 which is a radial shoulder ball bearing and which comprises a first track or groove 31, a first outer race 32 having a conical inside or inner surface 33 and a first cage or cage member 34 having balls or ball members 17. A seat or seat portion 35 for the first outer race 32 is also in the form of a hollow cylinder formed by the casing 12. A second ball bearing 36 which can also be, but need not be, a radial shoulder ball bearing comprises a second track or groove 37, a second outer race 38 having a conical inside or inner surface 39 and a second closed ball-guiding cage or cage member 40. The second outer race 38 of the second ball bearing 36 is received in a, for instance, hollow substantially cylindrical seat or seat portion 41. In contrast to the embodiment shown in FIG. 1, in the variant embodiment of FIG. 2 the inside or inner surfaces 33 and 39 of the first outer race 32 and the second outer race 38, respectively, are of substantially outwardly tapering or widening shape in a direction axially away from the center or central region of the rotational bearing arrangement 29.

As previously mentioned, it is extremely important in the operation of the rotational or rotary bearing arrangement for very high speeds of rotation that, and referring to the embodiment of FIG. 1, the balls or ball members 17 rotate accurately in the associated tracks or grooves 15 and 24 and also engage the outer races 16 and 25 accurately; the balls need an at most minimal clearance but they must not jam. According to the invention, this requirement is satisfied more particularly by the use of the radial shoulder ball bearings 14 and 30 shown in FIGS. 1 and 2 and by the way in which the rotational bearing arrangements 11 and 29 according to the invention are fabricated or produced.

In the case of the embodiment shown in FIG. 1, in the method of fabrication or production of the rotational bearing arrangement 11, the second outer race 25 is first introduced into the seat or seat portion 28 until it abuts the seat end 28a situated closer to the center or central region of the rotational bearing arrangement 11, whereafter the second outer race 25 is appropriately secured or fixed in desired manner, such as, for instance, by adhesive bonding, to the casing or housing 12. The shaft or shaft member 13 with the tracks or grooves 15 and 24 is then introduced into the casing 12 from the right in FIG. 1, the second cage or cage member 27 already having been placed on the shaft 13 with the balls or ball members 17 disposed above or around the associated track 24.

Next, the first cage or cage member 18 with its balls or ball members 17, is pushed over the shaft 13, the balls 17 taking up a position exactly above or around the associated track 15. The first outer race 16 is then pushed over the shaft 13. It is very important for the first outer race 16 to have an accurate fit in the seat or seat portion 20 and to be able to be axially reciprocated therein—that is to say, reciprocated relative to the lengthwise axis 21—substantially effortlessly. The first outer race 16 is pushed substantially effortlessly axially towards the center or central region of the rotational bearing arrangement 11 until the inside or inner surface 19 of the first outer race 16 engages the balls 17 of the cage 18 with a reduced predetermined bearing pressure. This substantially effortless pushing action means that such pushing action can stop in response to a very slight impacting at the balls 17, so that the positioning of the first outer race 16 is determined very accurately. The first outer race 16 is then secured or fixed to the casing 12, for example, also by adhesive bonding.

To ensure that the first outer race 16 abuts the balls 17 of the cage 18 and not accidentally the seat end 20a of the seat 20 and which is situated closer to the center or central region of the rotational bearing arrangement 11, the seat 20 is so dimensioned axially that the first outer race 16 can be reciprocated beyond the position in which it engages the balls 17—that is to say, beyond the position taken up by the first outer race 16 when the same is in its secured position. In other words, an assembly clearance 42 is left.

When the rotational bearing arrangement 11 is in operation, the shaft 13 usually heats up more than the casing 12, so that the balls 17 would jam if adjusted completely without clearance. However, jamming must be obviated. It is therefore usually necessary to move the first outer race 16 back slightly after it has been moved into engagement with the balls 17, the amount by which the first outer race 16 is moved back being such that the resulting clearance is exactly taken up at the working or operating temperature of the rotational bearing arrangement 11.

The rotational bearing arrangement 29 of the modified construction of FIG. 2 differs from the rotational bearing arrangement 11 of FIG. 1 mainly in that the inside or inner surfaces 33 and 39 of the radial shoulder ball bearings 30 and 36 have a shape which widens conically axially and outwardly away from the center or central region of the rotational bearing arrangement 29.

To assemble the rotational bearing arrangement 29, the second outer race 38 is first appropriately secured, as, for instance, by adhesive bonding The shaft 13 with the cage 40 and its balls 17 mounted thereon is then introduced into the casing 12 from the left, the shaft 13 with the balls 17 in engagement with the track or groove 37 being moved to the right axially in the casing 12 until the balls 17 engage the inside or inner surface 39. The first outer race 32 is then introduced over the shaft 13 and into the seat 35, and the cage 34, with its balls 17 exactly above or around the track 31, is moved over the shaft 13.

Finally, the first outer race 32 of the arrangement of FIG. 2 is moved to the right—that is to say, axially away from the center or central region of the rotational bearing arrangement 29—until the inside or inner surface 33 of the first outer race 32, engages the balls 17. As in the previous embodiment, it must be possible for the first outer race 32 to be reciprocated substantially effortlessly, that is, without the exertion of any great force, in the associated seat or seat portion 35. The first outer race 32 must engage the balls 17 with a slight predetermined pressure and, advantageously, the movements of the first outer race 32 cease immediately, as the result of a sensitive reaction, when the first outer race 32 engages or contacts the balls 17. After the first outer race 32 has been accurately positioned in this way, it is appropriately secured or fixed to the casing 12. Such securing or attachment operation can, as in the previous embodiment, be accomplished, for example, by adhesive bonding or by the injection or extrusion of plastics or metal, possibly with the additional use of ultrasonics or ultrasonic energy. Securing by injection or extrusion is shown schematically by an injection arrangement 44.

The embodiment of FIG. 2 has a relatively large assembly clearance 43. The reason for this is that when the cage 34 is pushed over the shaft 13, the distance between the balls 17 and the lengthwise or rotational axis 21 is greater than when the balls 17 are exactly above or around the track or groove 31. To enable the cage 34 with its balls 17 to be pushed over the shaft 13 in all circumstances, therefore, it must be possible to move the first outer race 32 adequately towards the center or central region of the rotational bearing arrangement 29—that is to say, a relatively large assembly clearance 43 is necessary.

With regard to the comments on heat expansion in connection with FIG. 1, it will be apparent that in the case of FIG. 2 the balls 17 cannot jam as a result of heating-up in operation. Since the shaft 13 expands more than the casing 12, at most some clearance will arise. In the example of FIG. 1 it is simpler to move the first outer race 16 in the associated seat 20 for positioning since accessibility is simpler than in the embodiment shown in FIG. 2. Consequently, the embodiment of FIG. 1 has the advantages over the embodiment shown in FIG. 2 of simpler fabrication or production and simpler adjustability of the working or operating clearance of the balls 17, whereas the embodiment of FIG. 2 has the advantage that there is no possibility at all of the balls 17 jamming.

Another advantage of the embodiment of FIG. 2 is that, compared with the embodiment of FIG. 1, it can receive higher mechanical loadings. The reason for this is that the forces which are operative between the first and second outer races 16 and 25 and 32 and 38, on the one hand, and the balls 17, on the other hand, and which can be caused, for example, by the spinning rotor 22, act in the directions indicated by the straight lines 45 to 48. Each line 45 to 48 extends from a place or location where a ball 17 bears on the corresponding inside or inner surfaces 19, 26, 33 and 39 of the outer races 16, 25, 32 and 38 to a place or location where the respective lines 45 to 48 intersect the lengthwise axis 21. The fact that the places or locations where the lines 47 and 48 intersect the lengthwise axis 21 are further apart from one another in the arrangement of FIG. 2 than the places or locations where the lines 45 and 46 intersect the lengthwise axis 21 in the arrangement of FIG. 1, explains why the rotational bearing arrangement 29 of FIG. 2 can deal with a greater load than the rotational bearing arrangement 11 of FIG. 1.

Finally, it is mentioned that the first outer race, particularly the first outer race 32 of the first ball bearing 30 can be provided with any suitable facility or means, such as the simply schematically indicated gripping portion or region 32a, for gripping and moving the first outer race 32 outwardly in axial direction with respect to the rotational bearing arrangement 29. It is also possible to use a separate tool to facilitate such movement of the first outer race 32.

While there are shown and described present preferred embodiments of the invention, it is to be distinctly understood that the invention is not limited thereto, but may be otherwise variously embodied and practiced within the scope of the following claims. Accordingly,

What we claim is:

1. A rotational bearing arrangement for high speeds of rotation, comprising:

a casing having a lengthwise axis;

a first ball bearing having balls;

a second ball bearing having balls;

a shaft rotatably mounted in the casing by means the first ball bearing and the second ball bearing;

said shaft having a first track for the balls of the first ball bearing and a second track for the balls of the second ball bearing;

said first ball bearing comprising a closed first ball cage coacting with the balls of the first ball bearing;

said second ball bearing comprising a closed second ball cage coacting with the balls of the second ball bearing;

said first ball bearing comprising a first outer race;

said second ball bearing comprising a second outer race;

said casing having a first hollow substantially cylindrical seat coaxially arranged with respect to the lengthwise axis of the casing;

said casing having a second hollow substantially cylindrical seat coaxially arranged with respect to the lengthwise axis of the casing;

at least said first ball bearing comprising a radial shoulder ball bearing;

said first outer race of the first ball bearing being secured in the first hollow substantially cylindrical seat in a non-biased manner;

said first hollow substantially cylindrical seat having a longer axial dimension than said first outer race and defining a sliding seat; and said first hollow substantially cylindrical seat and said first outer race possessing axial and radial dimensions such that said first outer race, prior to being secured in the first hollow substantially cylindrical seat, is substantially effortlessly slideable in said sliding seat in an axial inward direction of the casing beyond its operative position and subsequently in an axial outward direction of the casing into its operative position in the presence of the second outer race secured in its respective operative position.

2. The rotational bearing arrangement as defined in claim 1, wherein:

at least said first outer race is secured to said casing by adhesive bonding.

3. The rotational bearing arrangement as defined in claim 1, further including:

an injection arrangement for extruding a predeterminate material so as to secure at least said first outer race to said casing.

4. The rotational bearing arrangement as defined in claim 3, wherein:

said injection arrangement extrudes as said predeterminate material a plastic material.

5. The rotational bearing arrangement as defined in claim 3, wherein:

said injection arrangement extrudes as said predeterminate material a metallic material.

6. A rotational bearing arrangement for high speeds of rotation, comprising:

a casing having a lengthwise axis;

a first ball bearing having balls;

a second ball bearing having balls;

a shaft rotatably mounted in the casing by means of the first ball bearing and the second ball bearing;

said shaft having a first track for the balls of the first ball bearing and a second track for the balls of the second ball bearing;

said first ball bearing comprising a closed first ball cage coacting with the balls of the first ball bearing;

said second ball bearing comprising a closed second ball cage coacting with the balls of the second ball bearing;

said first ball bearing comprising a first outer race;

said second ball bearing comprising a second outer race;

said casing having a first hollow substantially cylindrical seat coaxially arranged with respect to the lengthwise axis of the casing;

said casing having a second hollow substantially cylindrical seat coaxially arranged with respect to the lengthwise axis of the casing;

at least said first ball bearing comprising a radial shoulder ball bearing;

said first outer race of the first ball bearing, for securement in an assembled state in said casing and defining a secured operative position of the first outer race, being introduced into the first hollow substantially cylindrical seat;

said first hollow substantially cylindrical seat defining a sliding seat;

said first hollow substantially cylindrical seat possessing seat dimensions such that said first outer race when introduced into, but not secured in, the first hollow substantially cylindrical seat can be reciprocated substantially effortlessly in axial direction of said lengthwise axis beyond a position assumed by said first outer race in said secured operative position thereof;

said casing having a central region;

said second ball bearing comprising a radial shoulder ball bearing;

each of said first and second outer races having a respective inner surface;

said inner surfaces of said first and second outer races of said first and second ball bearings opening substantially conically in the direction of the lengthwise axis of the casing towards the central region of the casing;

said first outer race being positioned, in its secured operative position in said first hollow substantially cylindrical seat, at a predeterminate location such that a predeterminate clearance exists between said balls of said first radial shoulder ball bearing and said inner surface of said first outer race and which predeterminate clearance is substantially eliminated in the presence of a predeterminate operating temperature during operation of the rotational bearing arrangement; and forces which are operative between said first and second outer races and the balls of the respective first and second radial shoulder ball bearings, acting along substantially straight lines which intersect said shaft axis at locations which are disposed further inwards axially of said rotational bearing arrangement than locations where said balls engage said inner surfaces of said first and second outer races.

7. A rotational bearing arrangement for high speeds of rotation, comprising:

a casing having a lengthwise axis;

a first ball bearing having balls;

a second ball bearing having balls;

a shaft rotatably mounted in the casing by means of the first ball bearing and the second ball bearing;

said shaft having a first track for the balls of the first ball bearing and a second track for the balls of the second ball bearing;

said first ball bearing comprising a closed first ball cage coacting with the balls of the first ball bearing;

said second ball bearing comprising a closed second ball cage coacting with the balls of the second ball bearing;

said first ball bearing comprising a first outer race;

said second ball bearing comprising a second outer race;

said casing having a first hollow substantially cylindrical seat coaxially arranged with respect to the lengthwise axis of the casing;

said casing having a second hollow substantially cylindrical seat coaxially arranged with respect to the lengthwise axis of the casing;

at least said first ball bearing comprising a radial shoulder ball bearing;

said first outer race of the first ball bearing, for securement in an assembled state in said casing and defining a secured operative position of the first outer race, being introduced into the first hollow substantially cylindrical seat;

said first hollow substantially cylindrical seat defining a sliding seat;

said first hollow substantially cylindrical seat possessing seat dimensions such that said first outer race when introduced into, but not secured in, the first hollow substantially cylindrical seat can be reciprocated substantially effortlessly in axial direction of said lengthwise axis beyond a position assumed by said first outer race in said secured operative position thereof;

said first outer race of said first ball bearing being secured in the first hollow substantially cylindrical seat in a non-biased manner;

said casing having a region;

said shaft having a shaft axis;

said second ball bearing comprises a radial shoulder ball bearing;

each of said first and second outer races having a respective inner surface;

said inner surfaces of said first and second outer races of said first and second ball bearings opening substantially conically in the direction of the lengthwise axis of the casing away from the central region of the casing; and forces which are operative between said first and second outer races and said balls of said first and second ball bearings acting along substantially straight lines which intersect said shaft axis at locations which are disposed further outwards axially of said rotational bearing arrangement than locations where said balls engage said inner surfaces of said first and second outer races.

8. The rotational bearing arrangement as defined in claim 7, wherein:

said first outer race includes means for engaging and moving said first outer race axially outwards in the direction of the lengthwise axis of the casing.

* * * * *